(12) United States Patent
Duke et al.

(10) Patent No.: US 9,347,521 B2
(45) Date of Patent: *May 24, 2016

(54) CVT BELT

(71) Applicant: THE GATES CORPORATION, Denver, CO (US)

(72) Inventors: Ralph Michael Duke, Lapeer, MI (US); John Graeme Knox, Oxford, MI (US)

(73) Assignee: Gates Corporation, Denver, CO (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/216,900

(22) Filed: Mar. 17, 2014

(65) Prior Publication Data

US 2014/0200108 A1 Jul. 17, 2014

Related U.S. Application Data

(63) Continuation of application No. 12/889,929, filed on Sep. 24, 2010, now Pat. No. 8,672,788.

(60) Provisional application No. 61/245,377, filed on Sep. 24, 2009.

(51) Int. Cl.
*F16G 5/08* (2006.01)
*B29D 29/08* (2006.01)
(Continued)

(52) U.S. Cl.
CPC *F16G 5/08* (2013.01); *B29D 29/08* (2013.01); *D02G 3/447* (2013.01); *F16G 1/08* (2013.01); *F16G 5/06* (2013.01); *F16G 5/20* (2013.01); *D10B 2101/12* (2013.01)

(58) Field of Classification Search
CPC ............. F16H 7/023; F16G 1/28; F16G 5/06; F16G 5/20

USPC ........................................................ 474/160
See application file for complete search history.

(56) References Cited

U.S. PATENT DOCUMENTS 4,276,039 A * 6/1981 Takano .......................... 474/205
4,504,258 A 3/1985 Tanaka et al.
(Continued)

FOREIGN PATENT DOCUMENTS

CN 1056650 A 12/1991
DE 3813338 A1 11/1989
(Continued)

OTHER PUBLICATIONS

Jim Shepherd, Bill Westhoff, & John Breed, "Developing a High-Performance Snowmobile Variable Speed Belt," Rubber Technology International '97, (1997) pp. 19-24, ISSN 1362-4679.
(Continued)

*Primary Examiner* — William E Dondero
*Assistant Examiner* — Mark K Buse
(74) *Attorney, Agent, or Firm* — Paul N. Dunlap, Esq.; Jeffrey A. Thurnau, Esq.

(57) ABSTRACT

A vulcanized rubber CVT belt in the form of an endless V-belt having a belt body with angled sides, a tensile cord layer of helically spiraled tensile cord embedded in the belt body, an overcord rubber layer, and an undercord rubber layer, wherein the tensile cord is a twisted, single-tow bundle of continuous-filament, carbon fiber impregnated with an adhesive treatment and/or overcoated with adhesive compatible with the rubber of the tensile cord layer. The tow may be 18K. The carbon fiber may have a filament diameter of from about 6.0 to about 6.4-micron, a tensile modulus of from about 200 to about 300 GPa, an elongation at break of from about 1.9% to about 2.3%.

17 Claims, 4 Drawing Sheets

(51) Int. Cl.
  *F16G 1/08* (2006.01)
  *F16G 5/06* (2006.01)
  *F16G 5/20* (2006.01)
  *D02G 3/44* (2006.01)

(56) References Cited

U.S. PATENT DOCUMENTS

| | | | |
|---|---|---|---|
| 4,509,938 A * | 4/1985 | Woodland | 474/264 |
| 4,708,703 A * | 11/1987 | Macchiarulo et al. | 474/268 |
| 5,610,217 A | 3/1997 | Yarnell et al. | |
| 5,807,194 A | 9/1998 | Knutson et al. | |
| 5,860,883 A * | 1/1999 | Jonen et al. | 474/205 |
| 6,500,086 B2 | 12/2002 | Serkh et al. | |
| 6,616,558 B2 | 9/2003 | South | |
| 6,620,068 B2 | 9/2003 | Ito et al. | |
| 6,695,733 B2 | 2/2004 | Knutson | |
| 6,945,891 B2 | 9/2005 | Knutson | |
| 8,206,251 B2 * | 6/2012 | Fan et al. | 474/205 |
| 2001/0041636 A1 | 11/2001 | Serkh et al. | |
| 2003/0130077 A1* | 7/2003 | Knutson | 474/260 |
| 2003/0134705 A1* | 7/2003 | Cheng | 474/205 |
| 2004/0043213 A1 | 3/2004 | Tonon | |
| 2004/0132571 A1* | 7/2004 | Knutson | 474/260 |
| 2006/0154770 A1* | 7/2006 | Takaba et al. | 474/263 |
| 2007/0046100 A1 | 3/2007 | McGilvrey et al. | |
| 2007/0098983 A1 | 5/2007 | Akiyama et al. | |
| 2007/0232429 A1* | 10/2007 | Knox | 474/205 |
| 2007/0244263 A1* | 10/2007 | Burrowes | 525/326.1 |
| 2007/0259746 A1* | 11/2007 | Wu | 474/260 |
| 2008/0261739 A1* | 10/2008 | Kanzow et al. | 474/266 |
| 2009/0011883 A1 | 1/2009 | Wu | |
| 2009/0142572 A1* | 6/2009 | Burlett | 428/295.1 |
| 2009/0227406 A1* | 9/2009 | Wu et al. | 474/238 |
| 2010/0105510 A1* | 4/2010 | Ohno | 474/260 |
| 2011/0129647 A1* | 6/2011 | Duke et al. | 428/156 |

FOREIGN PATENT DOCUMENTS

| | | |
|---|---|---|
| EP | 1108740 A2 | 6/2001 |
| JP | 08093858 | 12/1996 |
| JP | 2004225804 | 8/2004 |
| JP | 2005042229 A | 2/2005 |
| JP | 2006207772 A | 8/2006 |
| SU | 1154502 A1 | 5/1985 |
| WO | 02055920 A2 | 7/2002 |

OTHER PUBLICATIONS

Michael A. Kluger & Douglas R Fussner, "An Overview of Current CVT Mechanisms, Forces and Efficiencies," SAE Technical Paper Series 970688 (1997) pp. 81-88.

Vivek Adyanthaya, N B Joshi, & A D Samant, "Optimization and Evaluation of a Belt Driven CVT for a 125 cc, 4 Stroke Scooter," SAE Technical Paper Series 951773 (1995) pp. 1750-1761.

Wen-Fang Wu, Tyng Liu, & Chih-Hsien Wu, "Failure Modes and Reliability Analysis of Belt-Type CVT Systems for Scooters," SAE Technical Paper Series 2005-01-0819 (2005) pp. "all".

T F Chen, D W Lee, & C K Sung, "An Experimental Study on Transmission Efficiency of a Rubber V-belt CVT," Mech. Mach. Theory, vol. 33, No. 4, pp. 351-363 (1998).

Toray Carbon Fibers America Inc., "Torayca M30S Data Sheet," Technical Data Sheet No. CFA-010.

Toray Carbon Fibers America Inc., "Torayca M30G Data Sheet," Technical Data Sheet No. CFA-011.

Mitsubishi Rayon Co. Ltd., "Pyrofil: New Family of PAN Based Carbon Fibers," brochure.

Grafil Inc., "Pyrofil: Typical Properties of Carbon Fiber," Technical Datasheet, (Aug. 2009).

Wallace D Erickson, ed., "Belt Selection and Application for Engineers," Marcel Dekker, Inc., New York, (1987), p. 55, Ch. 6, pp. 158-160, 169.

International Search Report and Written Opinion of the ISA, PCT/US2010/050156, Dec. 23, 2010.

* cited by examiner

CVT BELT

CROSS REFERENCE TO RELATED APPLICATIONS

This invention is a continuation of U.S. application Ser. No. 12/889,929, filed Sep. 24, 2010, which claims the benefit of U.S. Provisional Patent Application No. 61/245,377 filed Sep. 24, 2009, the entire contents of which are all hereby incorporated herein by reference.

BACKGROUND OF THE INVENTION

1. Field of the Invention

This invention relates generally to power transmission drive belt for a variable-pitch drive, more particularly to a belt for a continuously variable transmission, and specifically to a rubber CVT belt with carbon fiber tensile cord.

2. Description of the Prior Art

Variable-pitch drives ("VPD") include at least one variable-pitch sheave. Speed ratios on these drives are controlled by moving one sheave sidewall relative to the other so that the belt rides at different pitch diameters in the variable-pitch sheave. A VPD may have two variable-pitch sheaves for a greater range of speed ratios. Such drives have traditionally all been called "variable-speed drives," but with the development of the closed-loop controlled, continuously variable transmission ("CVT"), the term "variable-speed drive" ("VSD") has come to be associated more with simpler open-loop controlled drives, in which a speed ratio is selected or dialed in or adjustable, and VSD will be used with that meaning herein. Thus, VSD are variable belt drives with relatively slow, infrequent, or manual speed shifting or ratio adjustment. A CVT, on the other hand, generally has some kind of closed-loop control or feedback mechanism for automatic and relatively rapid shifting based on the dynamics of the drive in a system. Often, in a CVT the driver sheave is controlled based on or reacts to a speed measurement or speed change in order to keep the power source or motor within an optimum power or speed range, and the driven sheave is controlled based on or reacts to the torque load. The variable-pitch sheaves may be adjusted by various mechanisms including mechanical, electro-mechanical, electronic, hydraulic, or the like. Belt-driven CVTs are widely used in scooters, all-terrain vehicles, snowmobiles, and even automobiles. Generally, as two pulley halves move axially apart or together to force a change in belt radial position in any VPD, the belt may be subjected to extreme friction forces as the belt changes radial position within the sheaves. As two sheave halves move together axially to increase the pitch line of the belt, the belt is subjected to extreme friction forces and to high axial or transverse compressive forces. High and variable torque loads result in high tension forces and high wedging forces which also result in high transverse compressive forces on the belt. Some VPD applications also use the belt as a clutch, resulting in additional frictional forces on the contact surfaces of the belt. All these forces may be most severe in a CVT because of the dynamics of the applications (e.g. frequent, rapid shifts, with high acceleration loads). As the CVT belt traverses the driver and driven pulleys, it is also subjected to continual bending or flexing. Rubber CVT belts are generally used without lubrication in so-called "dry CVT" applications. Thus, the VPD belt in general and the CVT belt in particular must be designed to have good longitudinal flexibility, high longitudinal modulus, high abrasion resistance, and high transverse stiffness. The belt must operate across a wide temperature range, for a long time.

Representative of the art is U.S. Pat. No. 6,620,068, which discloses a raw-edge double-cogged V-belt for variable speed drives having curvilinear cogs on the inside and outside, a layer of spirally wrapped cords made of fibers such as polyester, aramid, and/or glass fiber. The belt includes compression and tension layers of rubber containing short fibers aligned laterally for transverse reinforcement. The belt also includes a layer of reinforcing fabric on the inside and/or outside cog surfaces.

Also representative of the art is U.S. Pat. No. 4,708,703, which discloses a CVT belt with aligned upper and lower teeth and grooves, and with longitudinal cords. The teeth are preferably covered at their tops with transverse stiffening elements to deal with the problem of buckling and to increase the torque capability.

U.S. Pat. Nos. 6,695,733 and 6,945,891 to Knutson disclose a toothed rubber belt with carbon fiber tensile cord. Knutson's tensile member is an RFL-treated cord helically spiraled across the width of the belt in spaced side-by-side fashion. The cord examples given are all 6K-2 construction, although 12K-1, 6K-3, and other constructions are also mentioned. The cord may occupy from about 75 to about 95 percent of the belt width. Knutson merely suggests the cord can be used in V-belts among other belt types, but makes no mention of CVT belts.

U.S. Pat. Publ. No. 2001/041636A1 discloses a block type CVT belt comprising an endless load carrier having tensile members with a plurality of rigid blocks mounted thereon. Carbon fiber is mentioned as one of many possible tensile members. This design places no transverse load on the tensile member, but only on the blocks.

U.S. Pat. No. 5,807,194 to Knutson et al. describes carbon fibers, including a 6K-3 construction, for utilization in cast polyurethane toothed belts. The carbon fiber generally possesses a tensile modulus in the range of from about 50 GPa to about 350 GPa as determined in accordance with ASTM D4018. The cross-sectional diameter of the individual carbon fibers is said to be the range of from about 4 to about 7 μm. The carbon cord is not adhesive treated so as not to restrict penetration of the polyurethane materials during casting of the belt. Toothed belts do not operate under transverse loads.

Reference is also made to U.S. Pat. Nos. 8,206,251, 8,333,674, 8,425,357 and co-pending U.S. patent application Ser. No. 13/800,577 filed on Mar. 13, 2013, and Ser. No. 12/217,026 filed Jul. 1, 2008, the contents of which are incorporated herein by reference in their entirety.

SUMMARY

The present invention is directed to systems and methods which provide an improved CVT belt which provides improved CVT drive performance, and also provides improved belt building characteristics.

The present invention is directed to a vulcanized rubber belt for a variable-pitch drive in the form of an endless V-belt having a belt body with a top width, an overall thickness, angled sides, a tensile cord layer of helically spiraled tensile cord embedded in the belt body, an overcord rubber layer above the cord layer, and an undercord rubber layer below the cord layer. The tensile cord comprises a twisted, single-tow yarn of carbon fiber impregnated with an adhesive treatment, which is preferably compatible with the embedding rubber.

In various embodiments of the invention the carbon cord bundle may be an 18K single-tow, and/or the carbon fiber may have a filament diameter of from about 6.0 to about 6.4- micron, and/or a tensile modulus of from about 200 to about 300 GPa, and/or an elongation at break of from about 1.9% to about 2.3%.

In various embodiments the belt may have a ratio of top width to thickness in the range of from about 2.0 to about 3.0. The belt may also have a cog profile on the top and/or the bottom, which may be a dual-cog profile, which may have aligned roots and equal cog pitches. The belt may also have a relief angle near the bottom on the angled sides. The belt may further more exhibit a transverse stiffness at room temperature in the range of above 55 or from 55-75 N/mm/mm.

In various embodiments, at least one of the tensile layer, overcord layer and the undercord layer may comprise a polychloroprene rubber composition or an ethylene-alpha-olefin rubber composition. The tensile modulus of the rubber composition of the tensile layer may be higher than the tensile modulus of the rubber composition of the undercord layer when measured in the cross-grain direction perpendicular to any oriented fiber present in said compositions. The top and/or bottom surfaces may rubber, without any cover fabric.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 3:
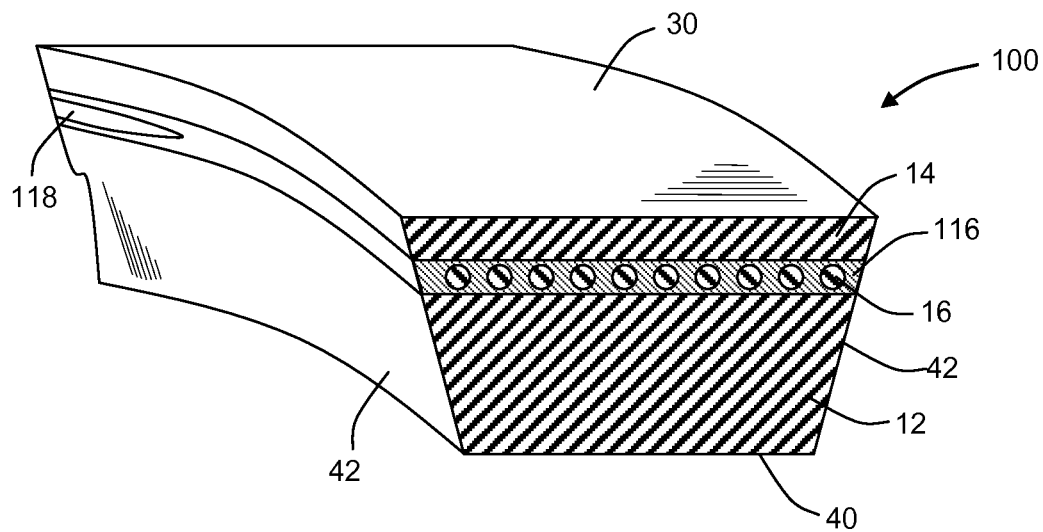
FIG. 3 is a partially fragmented perspective view of another embodiment of the invention.

FIG. 3 shows a typical embodiment of the invention in the form of a CVT belt or VPD belt. Belt 100 has a generally isosceles trapezoidal cross section, with back-, upper-, outer- or top-side 30 parallel to bottom-, lower-, or inner-side 40. The other two sides, lateral sides 42 are the pulley contact surfaces which define a V-shape with included angle α. The belt body includes tensile cord 16 embedded in optional adhesion gum layer 116, overcord layer 14, and undercord layer 12. Adhesion gum layer 116, overcord layer 14, and undercord layer 12 are generally vulcanized rubber compositions. At least the undercord layer may include dispersed short fibers oriented in the transverse direction to increase transverse stiffness of the belt body while maintaining longitudinal flexibility. Tensile cord 16 is the longitudinal load carrying member. It is conventionally a high modulus, fatigue resistant, twisted or cabled bundle of polyester, aramid, or glass fibers or yarns treated with an adhesive. In the present invention, the tensile cord is a twisted, single-tow bundle of carbon fiber filaments. In a preferred embodiment the tensile cord is a twisted, single-tow yarn of 18,000 carbon fibers, preferably with about 6.2 micron filament diameter. The under side or bottom of the belt is often "notched" or "cogged," i.e., given a wavy profile, to improve the balance of flexibility and stiffness required from the belt body. The bottom of the belt may be given an undercord fabric cover (or notch fabric) (not shown) to decrease the formation and propagation of cracks in the undercord and to increase the transverse stiffness of the belt body. Likewise the belt back may be given an overcord fabric cover (not shown) for similar reasons. In a preferred embodiment, no fabric is used.

Figure 2:
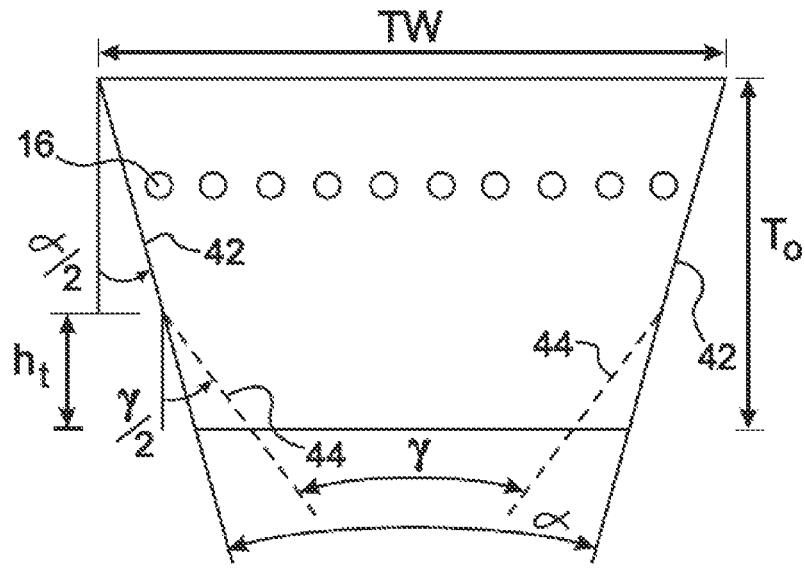
FIG. 2 is a cross sectional view of the embodiment of FIG. 1 through 2-2.

FIG. 2 shows another embodiment of the invention in cross section, having a single rubber composition for the belt body and tensile cords 16 embedded therein. The overall belt width is called the top width and identified as "TW" in FIG. 2. The overall thickness of the belt is identified as "$T_0$". For wide-range variable-speed drives, such as the CVT applications mentioned above, special belt cross sections that are relatively wide and thin, compared to single-speed V-belts, are required. Whereas a typical, conventional V-belt generally has a top-width of about the same dimension as the thickness, or a ratio of $TW/T_0$ from about 1 to about 1.7, a VPD or CVT belt according to the invention is typically at least around twice as wide as it is thick, or having a ratio of $TW/T_0$ of from about 2 to about 2.5 or even to about 3.0. The width, thickness and V angle determine the range of speed variation possible, as is known in the art. See for example, Wallace D. Erickson, ed., "Belt Selection and Application for Engineers," Marcel Dekker, Inc., New York, (1987), the contents of which are hereby incorporated herein by reference, and especially chapter six by David E. Roos, "Variable-Speed Drive Design Using V-Belts."

Turning to a more detailed description of the tensile cord, carbon fiber is generally made by carbonizing a precursor fiber such as polyacrylonitrile fiber wherein in the carbonizing process the diameter of the resulting carbon fiber is substantially reduced. While prior references, may generally disclose that any yarn size from 100 to 100,000 fibers may be utilized in a tensile cord, the yarns that have been commercially available are rather limited, including 1K, 3K, 6K, 12K, 24K, and 48K in filament count (i.e., the number of individual carbon fibers per yarn), with the most economical grades being 6K or 12K. Thus, to form a desired intermediate cord size has required bundling together multiple yarns of smaller filament count, for example, five 3K yarns to obtain 15K, or three 6K yarns to obtain 18K cord. As is well known in the art, carbon yarn and cord formed therefrom may be characterized by the number of fibers contained therein rather than by denier or decitex. A nomenclature of numbers and the letter "K" are used to denote the number of carbon fibers in a yarn. Thus, in a "3K" carbon fiber yarn, the "K" is an abbreviated designation for "1000 fibers", and the "3" designates a multiplier. Thus "18K" carbon yarn identifies a yarn of 18,000 fibers or filaments. Moreover with regard to cord nomenclature, in a "18K-3" carbon fiber cord for example, the "3" indicates that three 18K yarns are twisted and/or otherwise bundled together to thus form cord having a filament count of 54,000. Likewise, the available filament diameters of commercial yarns has been rather limited, with most suppliers offering a fine grade of about 5 microns and/or a grade of about 7 microns. Moreover, suppliers generally target various structural composite markets since very few flexible reinforcement applications have been commercially successful. While use of carbon fiber in rubber applications such as belts and tires was suggested many years ago, the practical difficulties in making and using such products have been prohibitive. For example, carbon fiber has been difficult to dip treat to obtain suitable penetration of adhesive into a bundle. Thus, numerous references have attempted to provide suitable adhesive systems for carbon fiber, and special treatment techniques have been needed, such as disclosed in U.S. Pat. Appl. Pub. No. 2004/0043213A1. As another example, carbon fiber yarn is prone to fraying during handling and is notorious for the fuzz that collects on dip treating and twisting equipment. Moreover, even if a seemingly suitable tensile cord is produced, it has been exceedingly difficult to obtain a carbon fiber reinforced rubber belt with suitable performance characteristics, such as long fatigue life, length stability, good adhesion, and the like. For example, U.S. Pat. No. 6,695,733, the contents of which are hereby incorporated herein by reference, discloses a number of detailed approaches to obtaining a suitable low-growth synchronous belt based on fine tuning the modulus of the RFL used to treat the carbon fiber yarn in the tensile cord. Thus, until the present invention, a suitable carbon fiber tensile cord for a commercially viable CVT belt has not been known.

The cord comprising the tensile member of the present member comprises a twisted single-tow yarn of carbon fiber of a suitable type. In the present context and throughout this disclosure, the terms "fiber" and "filament" are utilized interchangeably to designate a material having a small cross-sectional diameter, e.g., 4-7 μm, and a length at least about one hundred times it's diameter, but generally having an exceedingly great or even indefinite length; and which forms the basic element of a yarn. The term "yarn" is utilized herein and throughout this disclosure to designate at least two, but generally with regard to carbon fiber yarns, one thousand or more fibers that are laid and/or twisted and/or otherwise bundled together in a continuous strand to form a component of a cord. The term "cord" is utilized throughout this disclosure to designate the product of one or more yarns that may be twisted as is known in the art, and where two or more yarns are employed, may moreover be laid and/or bundled and/or twisted together and treated with a binder or adhesive for use in a reinforced rubber product, such as a belt. The term "tow" is used generally to indicate a zero-twist yarn as produced from a carbonization process. The term "single-tow" is used to refer to a zero-twist yarn consisting of only the original number of filaments as produced, at least during the final carbonization step. Thus a single-tow filament count will be indicated as a number and the letter "K" with the suffix "-1" to emphasize that it is not the combination of more than one smaller yarn.

Examples of carbon fibers are described for example in aforementioned U.S. Pat. No. 5,807,194, the contents of which are hereby incorporated herein by reference. Useful tows may for instance have a mass per unit length of from about 66 tex to about 3,600 tex, and a filament count (i.e., number of individual carbon fibers per yarn) of from about 1000 to about 60,000, depending on the size of belt, intended torque capacity, minimum bend radius, and the like, as one of skill in the art would understand. The carbon fiber for use in accordance with the present invention possesses a tensile modulus in the range of from about 50 GPa to about 350 GPa; preferably of from about 200 GPa to about 300 GPa; and most preferably of from about 235 GPa to about 275 GPa, as determined in accordance with ASTM D4018. The carbon fiber for use in accordance with the present invention possesses a tensile elongation of from about 1.9% to about 2.3%, preferably from about 2.0% to about 2.2%, more preferably about 2.1%. In embodiments of the present invention wherein the cross-sectional diameter of the individual carbon fibers is in the range of from about 4 to about 7 μm, the filament count of the cord utilized in the power transmission belt may be from about 6000 to about 60,000. In a preferred embodiment of the invention the cord's filament count may be about 18,000. In a preferred embodiment the cord's filament diameter may be from about 6 to about 6.4 microns, more preferably about 6.2 microns.

The carbon fiber tow may be twisted to improve handling, flexibility, etc. Twisting may be carried out using known methods and machines. The twist level should not be too high as to cause excess fiber breakage or make penetration by an adhesive treatment impossible. The twist level may be from about 0.5 to about 10 turns per inch ("tpi"), depending on the tow size. Preferably, the twist level, including for 18K-1 yarn, is a twist of about 0.75 to about 2 turns per inch is preferred.

Non-limiting examples of carbon fiber tows suitable for use in practicing the subject invention are made available commercially by Mitsubishi Rayon Co., Ltd. under the PYROFIL trademark, preferably PYROFIL TRH 50 18 k, which reportedly has a filament diameter of about 6 microns or 6.2 microns, a density of 1.82 g/cc, a tensile modulus of about 250 GPa, an elongation of about 2.1%, a mass per unit length of 1000 mg/m, a tensile strength of 5.30 GPa, and a filament count of 18K-1.

Fiber manufacturers typically coat fibers with a sizing, which generally serves to inhibit fracturing as the fiber is processed into yarns and wound onto spools, and/or to facilitate wetting of the fibers and yarns formed therefrom with cord treatment(s). In some instances, the sizing may thus have a chemical structure that is compatible with a cord treatment applied to the yarns and/or filaments for incorporation of treated cord into a power transmission belt, and may for example thus be a water- or solvent-based epoxy solution. Throughout the present disclosure, the term, "sizing" is used to denote a generally thin film applied to a yarn and/or yarn filament at a level of from about 0.2 to 2.0% dry weight, i.e., based on the weight of the dried, so treated yarn or filament, i.e., the dried yarn or filament to which the sizing had been applied, in order to function as hereinabove described. Both tows and yarns may have sizing, and will generally be presumed to have a sizing even if not mentioned.

In addition to the sizing provided by the carbon fiber manufacturer, an adhesive treatment may be applied to the carbon fiber bundle. The carbon fiber bundle may be impregnated with a wet adhesive composition, then dried or cured. Non-limiting examples of useful adhesives include: a resorcinol-formaldehyde resin/rubber latex solution ("RFL"); an epoxy; an isocyanate; a polyurethane; and combinations thereof. RFL is a preferred adhesive treatment. According to an embodiment of the present invention, it may be advantageous to select the elastic modulus of the RFL cord treatment through the manipulation of one or more variables, including by adjusting the cord processing conditions including the temperature to which the cord is exposed and/or the exposure period of the cord treatment-impregnated yarn during the treatment process (hereafter, the "processing conditions"); controlling the cord's final moisture content; adding relatively small amounts of a filler such as carbon black to the RFL cord treatment solution for impregnation in the carbon fibers; manipulating the formaldehyde:resorcinol weight ratio in the RFL; manipulating the resorcinol formaldehyde resin:latex weight ratio in the RFL, adding a minor amount of an aqueous dispersion of conventional antioxidant to the cord treatment solution, selecting a latex type for the RFL solution, and adding a blocked isocyanate to the RFL, all of which manipulations are disclosed in more detail in U.S. Pat. No. 6,945,891 to Knutson, which is hereby incorporated herein by reference. Various types of latex may be suitably used including for example, VPSBR, CSM, HNBR, SBR, CR, and the like.

The cord may be further coated with additional adhesive layers, primarily intended to coat the outside of the cord for enhanced adhesion to the rubber of the belt body. Such a generally external cord coating is referred to herein as an "overcoat" or overcoat adhesive. Overcoat is generally applied at a level in the range of from about 1% to about 10% dry weight, based on the final weight of the so treated cord. Examples of useful overcoat adhesives are found in the art and include various compositions sold under the trademarks CHEMLOK or CHEMOSIL by Lord Corporation, and various compositions sold under the trademark CILBOND by Chemical Innovations Limited (CIL). The particular overcoat may be chosen to be compatible with both the underlying adhesive treatment and the rubber belt body and to have other desired properties such as heat resistance, environmental resistance, or the like.

The belt body may be of any desired composition, but exemplary materials are vulcanizable rubber compounds based on elastomers such as natural rubber, polychloroprene, polyisoprene, styrene-butadiene rubber, ethylene-alpha-olefin elastomers, nitrile rubber, polyurethane elastomer, and the like. These elastomers may be compounded as known in the art with various fillers, short fiber fillers, plasticizers, oils, process aids, anti-oxidants, anti-ozonants, curatives, coagents, and the like. Exemplary rubber compositions for the belt body are based on the ethylene-alpha-olefin elastomers, such as EPDM, EPM, EOM, and the like, with peroxide curative and metallic salt of dicarboxylic acid as disclosed for example in U.S. Pat. No. 5,610,217, the contents of which are hereby incorporated herein by reference. Exemplary rubber compositions for the belt body and for the adhesion gum layer surrounding the tensile cord are disclosed for example in U.S. Pat. No. 6,616,558, the contents of which are hereby incorporated herein by reference. Another preferred rubber composition is one based on polychloroprene, which has excellent abrasion resistance. The tensile modulus of the adhesion rubber composition in the tensile layer may be higher than the tensile modulus of the rubber composition of the undercord layer when measured in the cross-grain direction perpendicular to any oriented fiber present in the compositions. In a preferred embodiment, the undercord and overcord are loaded with transverse oriented short fiber of aramid, polyamide, cotton, or the like, and the adhesion rubber composition may be a gum stock with no fiber filler.

Other reinforcing layers may be incorporated into the belt besides the tensile layer, such as other textile layers which may woven, non-woven, knit, or discontinuous fiber layers, oriented or not oriented as known in the art. For example, textile layers may be used at any surface of the belt for example to modify the surface properties, strengthen the resistance to crack formation and/or propagation, or the like. However, in a preferred embodiment, no fabric cover is used on the external surfaces of the belt.

According to an embodiment of the invention, the inside (i.e. bottom) surface, the outside (i.e. top) surface or both surfaces of the belt may include cogs according to a predetermined cog profile or profiles. The advantages of cogs may include improved flexibility without significantly increasing susceptibility to root cracking, improved crack resistance in the lower cog roots especially, and improved consistency of belt performance. A preferred dual-cog profile is described in U.S. patent application Ser. No. 12/432,985 filed Apr. 30, 2009, the contents of which are hereby incorporated herein by reference.

Figure 1:
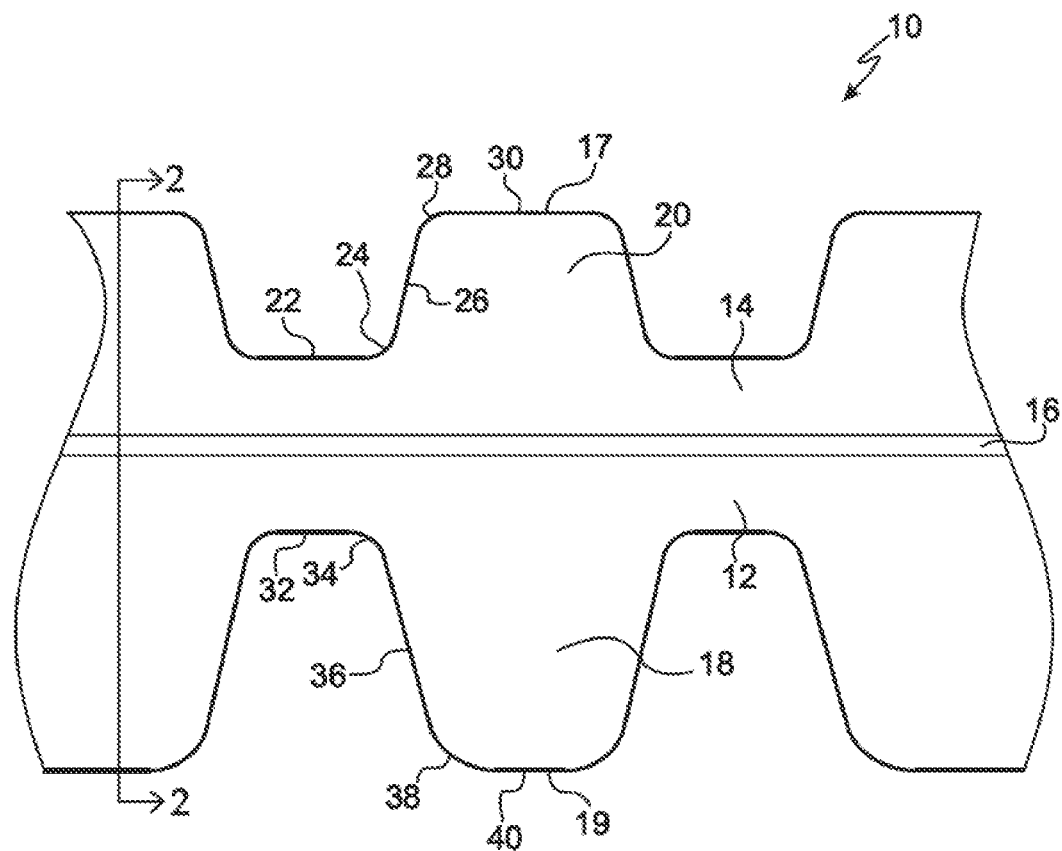
FIG. 1 is a partially fragmented side view of an embodiment of the invention.

Referring to FIG. 1, double-cogged CVT belt 10 includes tensile cord layer 16 sandwiched between overcord layer 14 and undercord layer 12 making up the main body of the belt. The double-cogged V-belt shown in FIG. 1 also has lower cogs 18 and upper cogs 20 protruding from the main belt body. Upper cogs 20 include tip 17, flank 26 and valley or root 22. Likewise lower cogs 18 include tip 19, flank 36 and root 32. The double-cogged V-belt of FIG. 1 is drawn in rack form, i.e., flat and without curvature of the tensile layer.

Thus, an embodiment of the VPD or CVT belt of the present invention may be a double-cogged V-belt with the upper and lower cog profiles symmetric and having lines ("L") and arcs ("A") connected according to a sequence beginning from the center of a root and extending to the center of an adjacent cog, the sequence being L1-A1-L2-A2-L3 for the upper profile and L4-A3-L5-A4-L6 for the lower profile, and with the sum of the length of L1 plus the radius of A1 equal to or within 20% of the sum of the length of L4 plus the radius of A3, and with at least one upper root and one lower root substantially aligned with each other. Referring to FIG. 1, L1 corresponds to half the width of root 22, A1 corresponds to root radius 24, L2 corresponds to flank 26, A2 corresponds to tip radius 28, and L3 corresponds to half the width of cog tip 17. Likewise, L4 corresponds to half the width of root 32, A3 corresponds to root radius 34, L5 corresponds to flank 36, A4 corresponds to tip radius 38, and L6 corresponds to half the width of cog tip 19. In one embodiment the upper and lower pitches may be equal and all the roots substantially aligned. In another embodiment there may be more upper cogs than lower cogs. The ratio of the number of upper to lower cogs may be up to 1.3, or from 1.1 to 1.3. In yet another embodiment, L4 has zero length, so that the lower profile has the sequence ALAL. In variations of this embodiment, the upper and lower pitches may be equal and all the roots substantially aligned, or there may be more upper cogs than lower cogs. In various embodiments, some or all arcs and lines may be connected tangentially. For example, lines L1 and L2 may connect tangentially with arc A1, and said lines L4 and L5 may connect tangentially with arc A3. Preferably L1, L3, L4, and L6 connect tangentially with their mirror images at the centers of the roots and centers of the cog tips, so that the roots and tips are flat and smooth. In various embodiments, the flanks of the cogs may be at an angle so that the included angle between opposing cog flanks is in the range of from about 10 to about 30 degrees.

FIG. 2 shows a cross section of an embodiment of the invention taken at the plane 2-2 in FIG. 1 and illustrating an optional relief angle feature of the inventive belt. The pulley contact faces or side surfaces 42 of the V-belt are cut at an angle $\alpha/2$ with respect to the vertical axis of the belt, which should generally coincide with the vertical axis of a pulley or drive system. Thus, a pair of opposing belt side surfaces 42 describe an included angle $\alpha$. Each side surface 42 engages a sheave during operation, with the sheave angles also substantially equal to α/2. Although FIG. 1 from which the view of FIG. 2 was taken is of a double-cogged CVT belt, it should be understood that the section of FIG. 2 is equally representative of a single-cogged CVT belt or a CVT belt with no cogs.

In embodiments of the invention, it may be advantageous for the angled sides of the belt, or each cog if cogs are present, to further include an opposing pair of second side surfaces 44 which are disposed toward a the inside surface of the belt or the lower cog tip 40 and which are cooperating with the first side surfaces 10. Each pair of second side surfaces 44 describes an included angle γ. Angle α may be in the range of approximately 15° to 50° (so about 7° to about 25° per pulley sheave angle). Angle γ may be in the range of approximately 25° to 65°. Namely, γ=α+(2×relief angle). The "relief angle" may be equal to or greater than approximately 5° and may be defined as (γ/2−α/2). It is believed the cooperating nature of the first side surfaces and second side surfaces results in a significant reduction in noise generated by the belt during operation. All numeric values used in this specification to describe the invention are examples only and are not intended to limit the breadth or applicability of the invention unless otherwise stated. By way of example, the second side surface 44 may comprise a relief angle of approximately 5° which prevents the second side surface 44 from coming in contact with a sheave. Assuming an angle α of 20°, this gives an angle γ of 30°. The cog tip cut height, ("$h_t$") in FIG. 2, may be adjusted as needed, for example, it may be about 1 to 5 mm. More details on this optional feature of the inventive CVT belt may be found in U.S. patent application Ser. No. 12/217,026 filed Jul. 1, 2008, the contents of both of which are again incorporated herein by reference in their entirety.

The invention may be made according to known methods of belt making, including for example, building up the various layers of textiles, elastomers, and tensile members, upright or inverted, on a cylindrical mold or on a mandrel for transfer to a mold. The tensile cord may be helically wound about the mandrel with a predetermined cord spacing or number of ends per unit width. The mold may have the cog profile formed therein and/or so-called "matrix" may be used to produce a cog profile. After curing or vulcanization to form a slab, individual belts may be cut and/or ground therefrom with the proper contact surface V-angle or angles and inverted if necessary.

During the process of belt building, it was noted that the 18K single-tow carbon fiber cord maintained a highly circular cord shape. This was in contrast to previous experience with multi-tow yarns, such as 6K-3 or 6K-2 yarns, which would exhibit distinct lobes and/or flattened portions, leading to difficulties maintaining even spacing when helically winding those cords onto a belt build, i.e., onto a layer of rubber on a mandrel. Thus, the single-tow carbon cord of the present invention provides an improvement in the belt manufacturing process and in the quality of the resulting belt, in the form of more evenly spaced cords. It may also be that the improved circular shape contributes to the increased axial stiffness and belt support.

A number of CVT belt examples were made to illustrate aspects and embodiments of the invention. Each comparative example (designated "Comp. Ex.") and each example (designated "Ex.") is based on the same general CVT belt construction. The belt construction uses an EPDM fiber-loaded undercord material, a high modulus EPDM adhesion gum, and a fiber-loaded EPDM overcord material. The EPDM compositions were similar to those disclosed in U.S. Pat. Nos. 5,610,217 and 6,616,558. No fabrics or other reinforcing layers were present. The belts were all built and cured as a slab on a mandrel, then square cut, and finally the sides ground to a V included angle of 26 degrees and with a top width of 33.6 mm, and an overall design thickness of about 16 mm, giving a ratio of top width to overall thickness of 2.1. The belts incorporated the double-cogged profile with aligned roots and LALAL type profiles as described above. The sides of the lower cogs had a relief angle of 5 degrees intersecting the side about 4 to 5 mm from the cog tip, (i.e., $h_t$ as described above). The cords all had a similar diameter of about 1.2 mm, and a similar packing in the tensile layer of about 23-24 ends per inch. Comparative cords included both KEVLAR and TECHNORA aramid cords and fiber glass cords, all believed to have functionally similar RFL and overcoat adhesive treatments. The inventive example used PYROFIL TRHSO 18K single-tow carbon fiber cord twisted at 1.5 tpi target (1.6 tpi actual) and treated with X-HNBR RFL and CILBOND overcoat. Longitudinal modulus was measured by mounting an inverted belt on two smooth, 4.25-in-diameter flat pulleys and pulling on a conventional tensile test machine at 50 mm/min with a clip-on extensometer optional. A number of other special tests were carried out to evaluate the potential for improved performance as a CVT belt.

Figure 5:
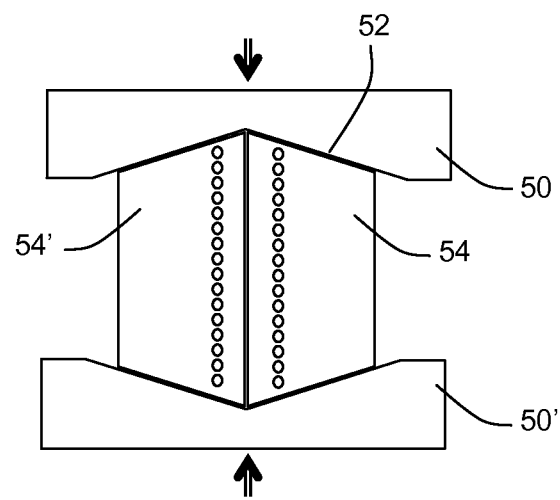
FIG. 5 is a diagram illustrative of an axial stiffness test.

Belt axial stiffness, that is, transverse stiffness, is critical for CVT belt performance including supporting cord tension. An axial stiffness test is illustrated in FIG. 5. Axial stiffness was measured by compressing two sections 54, 54' of a CVT belt held back-to-back between two compression fixtures 50, 50' each having V-shaped portion 52 adapted to match the angle of the sides of the belts. The arrows in FIG. 5 indicate the direction of the applied compressive strain, which is supplied by a conventional hydraulic or screw-driven tensile test machine. The stiffness was defined as the force divided by the length of the belt sections divided by 2, divided by the deflection, and was reported in units of N/mm length/mm deflection. The platen moved at 0.3 mm/s rate of compression for a total displacement of 3 mm, then returned to zero, then repeated twice more. The axial stiffness is taken as the average of three repeats of the slope through the final point. Axial stiffness was only quantified in a relaxed belt section, but is expected to provide a reasonable approximation to the axial stiffness of a tensioned belt in a CVT drive. Fibers and cords are known to reinforce rubber, but for highly oriented fiber or cords the reinforcing effect is mainly in the direction parallel to the fiber orientation, and minimal in the transverse direction. Since the tensile cord is oriented in the longitudinal direction it is not expected to greatly affect the transverse stiffness of the belt. Thus, many previous belt designs used additional means to increase the transverse stiffness, such as transverse oriented short fiber loadings, transverse rods or beams, transverse tire cords, fabrics and the like. Surprisingly it has now been found that the carbon cord, according to an embodiment of the present invention, has a much greater than expected effect on the axial stiffness of the CVT belt. The Tables below illustrate this axial stiffness effect.

Table 1 shows a comparison of measured axial stiffness of a number of types of tensile cords, in which carbon fiber gives a higher axial stiffness than either glass or aramid cords. Table 1 shows that the belts varied in longitudinal modulus, in accord with expectations for different cord material types. Table 1 shows that for the glass and aramid cords of Comp. Ex. 1-4, the axial stiffness shows essentially no significant differences among the different cord material types of Comp. Ex. 1-4. However, Ex. 5, the inventive carbon cord belt, exhibits significantly greater axial stiffness (about 20% greater) than the comparative belts. Table 2 shows that this affect is consistently observed across a wide temperature range, from room temperature to 100° C. On the average, the carbon cord gives the inventive CVT belt about a 24% increase in axial stiffness over an equivalent aramid belt. Thus, in embodiments of the invention, the axial stiffness according to the test described herein may advantageously be greater than about 55 N/mm/mm, or from 55 to 75 N/mm/mm, or from 60 to 70 N/mm/mm.

TABLE 1

|  | Comp. Ex. 1 | Comp. Ex. 2 | Comp. Ex. 3 | Comp. Ex. 4 | Ex. 5 |
|---|---|---|---|---|---|
| Cord Material | E-Glass | Kevlar ®[1] T956E | Technora ®[2] | Kevlar ® T965 | Pyrofil ™ TRH50 |
| Cord Construction | 1300 denier (110-1/13) | 9600 denier (1600-2/3) | 9,000 denier (2250-1/4) | 8640 denier (2160-1/4) | 18K-1 |
| Longitudinal Belt Modulus (N/mm) | 15,500 | 27,250 | 39,500 | 49,250 | 39,600 |
| Axial Belt Stiffness (N/mm/mm) | 50.6 | 53.1 | 51.1 | 52 | 61.6 |

[1]Kevlar ® is a trademark for para-aramid fiber from DuPont.
[2]Technora ® is a trademark for para-aramid copolymer fiber from Teijin-Conex.

TABLE 2

| Temperature (° C.) | Comp. Ex. 2 Aramid | Ex. 5 Carbon | Difference (%) |
|---|---|---|---|
| 23 | 51.3 | 61.6 | 20 |
| 50 | 44.3 | 56.0 | 26 |
| 75 | 39.6 | 50.0 | 26 |
| 100 | 36.7 | 45.3 | 23 |

It should also be noted that the example belts exhibited different degrees of flexibility or bending stiffness. In particular, the inventive belt of Ex. 5 was considerably stiffer in longitudinal bending than Comp. Ex. 2 with aramid cord. This was unexpected since the carbon cords had finer carbon fiber, i.e., 6.2 micron in diameter, than the 7-micron grades used in the past, for example in U.S. Pat. No. 6,945,891. Stiffer belts would not normally be considered desirable, because of increased hysteresis, lower efficiency, higher tensions, and the like. Nevertheless, the inventive carbon fiber belts exhibited very good belt performance, in spite of a higher belt running temperature on the Step-Stress Test described below.

Figure 4:
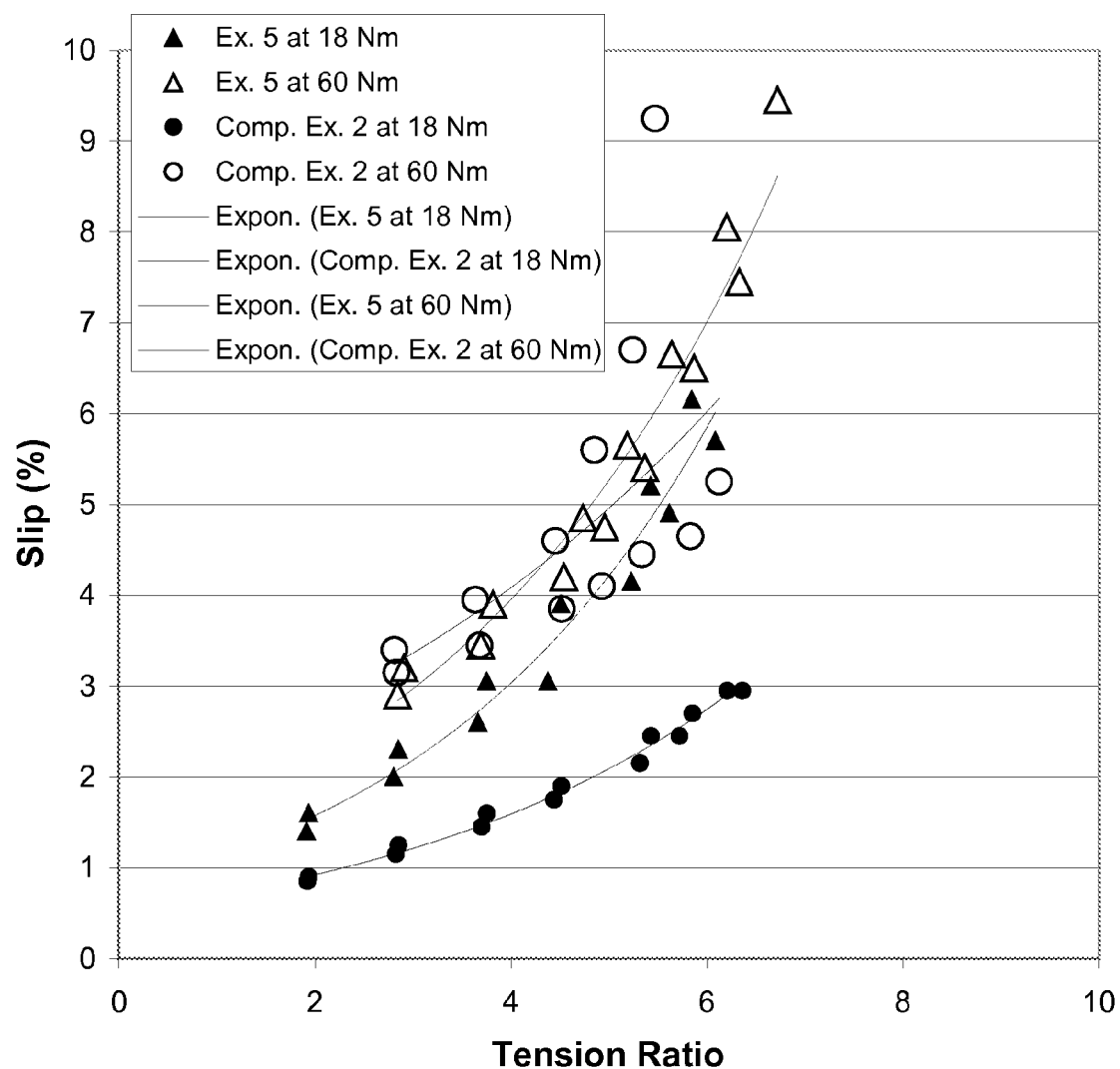
FIG. 4 is a comparative graph of a belt characteristic from a tension ratio slip test.

This increase in axial stiffness is believed to result in improved performance on at least two other belt tests: the Tension Ratio Slip ("TRS") test and the Step-Stress Screening test. The TRS test measures belt slip, at a given load, across a number of belt tensions. The results are graphed in an X-Y plot with the tension ratio along the abscissa, and the slip percent on the ordinate, as shown in FIG. 4. In the TRS test, perfect transfer of power would result in a flat line, of zero slip magnitude on the graph. In other words, there would be zero slip at any load. A perfect V-belt, because it must have some creep slip to function, would still exhibit a flat line, but would have a creep magnitude in the 1% to 5% range. Different belts with different coefficients of friction or different transverse and longitudinal elastic properties will exhibit different levels of creep and exhibit different transitions between creep and gross slip, resulting in different curve shapes. The aramid belt, Comp. Ex. 2, and the inventive belt Ex. 5 were tested on the TRS test, and the results are indicated graphically in FIG. 4. Two torque levels were used, 18 Nm and 60 Nm. At each torque level the percent slip was plotted versus the tension ratio. The 18 Nm curves for the two belts are not the same, which is expected in light of the differences in flexibility and axial stiffness mentioned above. The stiffer carbon belt of Ex. 5 exhibits a higher level of creep than the aramid belt at 18 Nm torque. However, the belt performance is mostly within the normal range of 1% to 5% creep expected for V-belts. Now looking at the 60 Nm torque curves for the two belts, one sees a dramatic change in relative behavior. At 60 Nm the aramid belt of Comp. Ex. 2 begins to exhibit instabilities and gross slip above a tension ratio of about 4, as indicated by the wild scatter in the data points. The increase in creep percent of the 60 Nm curve over the 18 Nm curve is at least 2% at lower tension ratios for the aramid belt. On the other hand, the carbon fiber belt is still stable at 60 Nm, and the increase in creep over the 18 Nm curve is only about 1% regardless of the tension ratio. The stability of the carbon cord belt is indicated by the relatively small scatter in the data points. In summary, the increased axial stiffness of the inventive belt with 18K-1 carbon cord results in higher torque load power transmission capability and reduced variation in creep or slip performance, relative to previous state of the art aramid cord belts. This should translate directly into improved CVT performance.

The Step-Stress Test is a form of accelerated belt life testing in which the torque load or stress level is increased incrementally until the belt fails. The textbook, Wayne Nelson, "Accelerated Testing, Statistical Models: Test Plans, and Data Analyses," Wiley Interscience, New York, pp 493-505 (1990), provides a detailed discussion of the history, methods and examples of step-stress fatigue models and data analyses which is hereby incorporated herein by reference. In this case, the belt load was increased every 24 hours approximately, with all other test parameters, e.g. rotational speed and tension ratio, kept constant until failure of the belt under test. For the purposes of relative belt comparisons, expected to be predictive of performance on aggressive CVT applications, the power transferred through the belt is integrated from time zero to failure by summing the power curve for each step over the life of the belt, $$\sum_{t=0}^{t=failure} p(t)\Delta t,$$

where p is power and t is time. This summation yields the cumulative work done by the belt. Table 3 shows the sequence of loads and times for a typical belt test on Ex. 5. Also shown in Table 3 is the belt temperature during each step and the lifetime cumulative work. Table 4 gives the lifetime cumulative work for each of five belts of Comp. Ex. 2 and two belts of Ex. 5, along with averages. Thus, for the inventive belt of Ex. 5, the average total power life was 1156 kWh, a 15% improvement over Comp. Ex. 2. The data were also fit to a Weibull distribution, and the 15% improvement was found to be statistically significant at the 95% confidence level at least. Thus, carbon fiber cord according to an embodiment of the invention provides a significant performance improvement over conventional aramid cord of similar dimensions. Since this test is greatly accelerated, these results should translate to a much greater increase in belt life in the field, or an increase in power capability at equal life.

TABLE 3

| Time (Hours) | Power Level (kW) | Step Work (kWh) | Belt Temp. (° F.) |
|---|---|---|---|
| 0 | 3.7 | 71.6 | |
| 19.2 | 7.1 | 184.9 | 200 |
| 45.3 | 7.8 | 205.9 | 259 |
| 71.6 | 8.6 | 183.5 | 255 |
| 93 | 9.3 | 212.5 | 279 |
| 115.8 | 10.1 | 264.8 | 295 |
| 142.1 | 10.8 | 69.2 | 285 |
| 148.5 | 10.8 | | |
| Lifetime Cumulative Work (Ex. 5) | | 1192.4 | |

TABLE 4

| | Comp. Ex. 2 | Ex. 5 |
|---|---|---|
| Lifetime Cumulative Work (kWh) | 1119.6 | 1192.4 |
| | 927.8 | 1119.0 |
| | 1027.6 | |
| | 981.6 | |
| | 979.2 | |
| Average Cumulative Work (kWh) | 1007 | 1156 |

It should be understood that the design of variable-speed belt drive systems involves trade-offs among belt width, thickness, and v-angle. Increased speed ratio range results from reducing the thickness, reducing the angle, and/or increasing the width. But increased load capacity or transverse stiffness comes from increasing the thickness, reducing the angle and/or reducing the width of the belt. Belts that are too thin and/or wide have a tendency to collapse inward under tension from lack of support. By providing a 20% or greater transverse stiffness from choice of tensile cord, the present invention greatly improves the design choices by permitting thinner, wider and/or narrower angled belts than the prior art. The designer now has access to a better combination of load capacity and speed range than before.

The single-tow carbon fiber cord as described herein could also be used to advantage in various other applications requiring longitudinal reinforcement of flexible rubber articles, with or without transverse load requirements. Nonlimiting examples include: rubber tracks for snowmobiles, tanks, or other track or tread driven vehicles; toothed belts, multi-v-ribbed belts, flat belts, conventional V-belts including agricultural belts, automotive accessory drive belts, and belts in general whether endless or long-length, whether for transport, power transmission, indexing or timing, or other applications; braided or spiraled reinforcement for flexible hose or tubing applications; airsprings; and so on.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A vulcanized rubber CVT belt for a variable-pitch drive in the form of an endless V-belt having a belt body comprising a top surface, a top width, a bottom surface, an overall thickness, angled sides, a tensile cord layer of helically spiraled tensile cord embedded in a rubber composition, an overcord rubber layer, an undercord rubber layer, a relief angle near the bottom on the angled sides, and a top cog profile on the top and a bottom cog profile on the bottom;
   with the tensile cord comprising a twisted, 12K or 18K, single-tow yarn of carbon fiber impregnated with adhesive treatment; and
   wherein the ratio of said top width to said overall thickness is in the range of from about 2.0 to about 3.0.

2. The belt of claim 1 wherein the yarn is an 18K single-tow.

3. The belt of claim 1 wherein the yarn is a 12K single-tow.

4. The belt of claim 1 wherein the carbon fiber has a filament diameter of from about 6.0 to about 6.4-micron, a tensile modulus of from about 200 to about 300 GPa, an elongation at break of from about 1.9% to about 2.3%.

5. The belt of claim 1 wherein the filament diameter is about 6.2-microns, the tensile modulus is from about 235 to about 275 GPa, and the elongation is about 2.1%.

6. The belt of claim 1 wherein the cord comprises an overcoat adhesive compatible with the embedding rubber.

7. The belt of claim 1 wherein said twist is in the range 0.75 to 2.0 turns per inch.

8. The belt of claim 1 having a transverse stiffness at room temperature in the range above 55 N/mm compression/mm length.

9. The belt of claim 1 having a transverse stiffness at room temperature in the range of from 55 to 75 N/mm compression/mm length.

10. The belt of claim 1 wherein at least one of the tensile layer, overcord layer and the undercord layer comprise a polychloroprene rubber composition.

11. The belt of claim 1 wherein at least one of the tensile layer, overcord layer and the undercord layer comprise an ethylene-alpha-olefin rubber composition.

12. The belt of claim 1 wherein the tensile modulus of the rubber composition of the tensile layer is higher than the tensile modulus of the rubber composition of the undercord layer when measured in the cross-grain direction perpendicular to any oriented fiber present in said compositions.

13. The belt of claim 1 wherein the top and bottom cog profiles are of equal pitch.

14. The belt of claim 13 wherein the top and bottom cog profiles have aligned roots.

15. The belt of claim 1 wherein the top surface is rubber, not fabric; and the bottom surface is rubber, not fabric.

16. The belt of claim 1 wherein the adhesive treatment is other than a resorcinol-formaldehyde reaction product.

17. The belt of claim 16 wherein the adhesive treatment comprises one or more selected from the group consisting of an epoxy, an isocyanate, and a polyurethane.

* * * * *